Patented Apr. 6, 1937

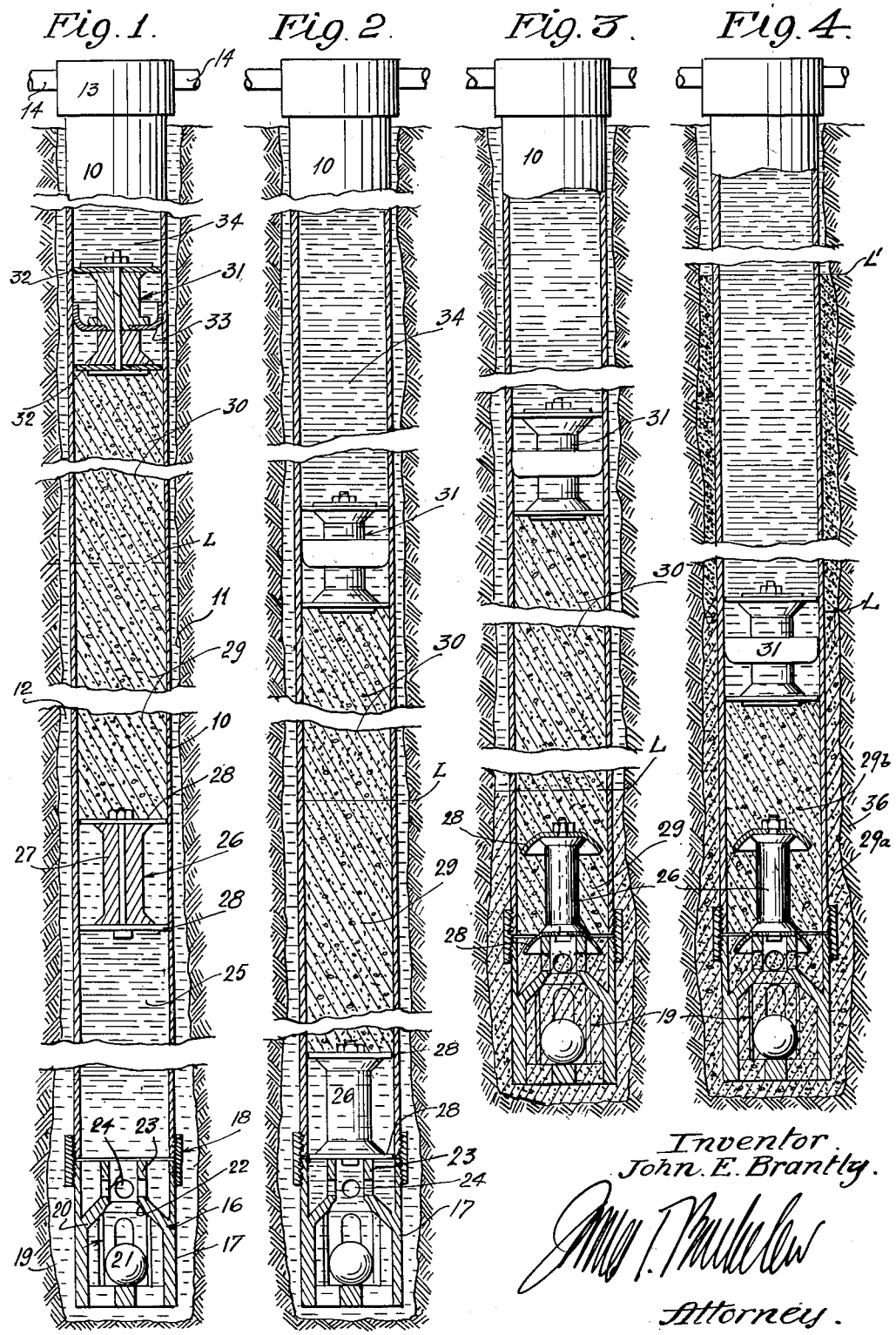

2,075,882

UNITED STATES PATENT OFFICE 2,075,882

METHOD OF CEMENTING WELLS

John E. Brantly, Avenal, Calif.

Application October 4, 1935, Serial No. 43,522

13 Claims. (Cl. 166—21)

This invention relates to an improved method for cementing wells, and has for its general object to provide a system for cementing off the water bearing formation, that will permanently insure the well against the flow of water from the cemented zone into the production pipe or casing.

In order that the invention may be most clearly understood, particularly as to differences from the customary practice that are responsible for the ability to accomplish by the present method a superior cementing job, brief reference is made to the general operations involved in the ordinary procedure followed in cementing a well. Where the well is drilled through a water bearing stratum or formation to the oil sands below, it is necessary to cement off this water bearing formation around the casing to prevent the flow of water into the well when drilling is carried into the oil sand and the well comes into production. The common method of cementing off the water strata has been to drill through it, and to then pump down through the casing and discharge from its lower end a volume of cement that rises within the space between the casing and bore wall a distance sufficient to seal off the water. Fluid pressure is maintained through the casing on the cement thus deposited upwardly around its lower extent, sufficiently long to enable the cement to set, after which drilling operations are resumed.

It frequently occurs, however, particularly where the well is being drilled through water bearing formations that for various reasons may be difficult to seal off, that immediately or at some later time after completion of the cementing operation, water gains access to the well, thus indicating that either the cement itself has not formed a fluid-tight barrier and is water pervious, or conditions at the bond between the cement and the water bearing formation are such that the cement has not sealed the interstitial pores of the formation. A faulty cementing job is expensive in that it necessitates further cementing operations to completely exclude the water, and the subsequent operations are made all the more difficult by reason of the presence of cement in the well and the uncertainty as to the particular condition responsible for water leakage.

As stated, the difficulty seems to arise as a result of possible porosity in the cement itself, and the inability to maintain a water-tight seal at the wall of the bore. Responsibility for these conditions in turn, is believed to be the inability, using past methods, to place the cement around the casing under sufficient pressure to compress the cement itself to the extent of rendering it impervious to water, and to force the cement sufficiently far into the interstitial spaces of the formation, to preclude any possibility of leakage along the bore wall after the cement has set. It will be understood that in the usual well cementing operations, the only pressure that can have any effect upon compressing the cement or causing it to impregnate the formation, is that imposed by the hydrostatic head against which the cement is pumped into the well bore.

The present method overcomes these usual difficulties by providing a means whereby it is possible to subject the cement placed around the casing to compression pressures sufficient to render the set cement non-porous, and to cause the cement while in fluid condition, to permeate the formation to such depths as will assure a complete and permanent seal against water flow into the well. Generally speaking, the present method contemplates, in one of its aspects, forming a barrier at one point or zone along the casing, either within or beyond the water bearing formation, and then forcing cement into the space surrounding the casing and against the barrier, under pressure sufficient to close any voids in the cement and to cause the cement to penetrate the water stratum, at least if the formation will permit. My preferred method of forming the barrier and then forcing the cement under pressure around the casing and against the barrier, is to pump downwardly through the casing a volume of cement, then flow this cement up around the casing to form a plug or barrier spaced a suitable or predetermined distance above its lower end, and, after this first volume of cement has set sufficiently to form a barrier, to force a second volume of cement into the space below and against the barrier. While the second mentioned volume of cement is still in fluid condition, it is compressed under fluid pressure exerted through the casing and forced into the formation interstices.

My preferred method also involves a novel feature in the use of two cements having different times of setting. Briefly, I simultaneously pump down through the casing a predetermined volume of comparatively quick setting cement, followed by a measured volume of comparatively slow setting cement, the respective volumes of the two cements depending upon conditions existing in the well and the amounts required to serve their respective purposes. These two cements may have any suitable relative times of setting, providing the slow setting cement will remain in fluid, or at least semi-fluid condition after the quick setting cement has set sufficiently to form a barrier. As a typical example, the quick setting cement may take its initial set at about two hours after it is pumped into the casing, and the relatively slow setting cement at about six hours.

The quick setting cement is discharged from the casing, preferably at its lower end, and is forced upwardly around the casing followed by at least a portion of the slow setting cement, sufficient to elevate the entire body of quick setting cement to a distance above bottom of the casing, the particular distance being dependent upon conditions in the particular well and the quantities of the two cements being predetermined accordingly. During the time the quick setting cement takes its initial set, it is supported by way of the fluid column in the casing and the body of slow setting cement, a portion of which ordinarily will be allowed to remain in the casing until the cement barrier is formed. Then pressure is exerted on the slow setting cement, causing it to compress and penetrate the formation.

The above mentioned features and objects of the invention are given a more detailed explanation in the following description of a preferred method for carrying out the invention. Various steps and operations involved in the method are diagrammatically illustrated in the accompanying drawing, in which:

Fig. 1 is a sectional view showing the casing positioned in the well bore with the volumes of quick setting and slow setting cements placed in the casing at the beginning of the cementing operation;

Fig. 2 is a view similar to Fig. 1 showing the cement at substantially the point of discharge into the well; and Figs. 3 and 4 illustrate the subsequent operations in which the quick setting cement is placed as a barrier above the lower end of the casing, and the slow setting cement forced into the well below the barrier.

In the drawing, the well casing 10 is shown lowered into the well bore 11 of somewhat larger diameter, leaving an annular space 12 between the casing and the wall of the bore. The casing is provided with the usual head 13 having a cement inlet 14 and an inlet 15 through which circulating fluid is pumped into the casing to force down the column of cement in the later described operations. The casing carries on its lower end a cementing shoe 16 which may be of any suitable type now in common use. With this understanding, I have conventionally illustrated a casing shoe comprising a tubular body 17 connected at 18 with the lower end of the casing, and containing a check valve assembly 19 which operates to prevent return flow of cement from the well back into the casing. The check valve assembly 19 comprises a tubular cage 20 containing a ball check 21 adapted to seat upwardly against shoulder 22 within the cage. Normally, fluid is permitted unrestricted flow down through a tubular top extension 23 of the cage, ports 24 being provided in order that when the shoe is engaged by a plug, as will later appear, cement may still flow through openings 21 and into the well.

At the commencement of the well cementing operation, I first insert into the casing on top the column 25 of circulating fluid therein, a suitable plug 26, shown conventionally as comprising a body 27 carrying on its upper and lower ends a pair of flexible rubber or leather discs 28. I then pump into the casing a measured volume of quick setting cement 29 on top of plug 26, forcing the latter down as the cement is pumped into the casing. Next, a predetermined volume of relatively slow setting cement 30 is pumped into the casing following and preferably directly on top of the fast setting cement 29, the interface of the two bodies of cement being indicated by the dotted line L. Finally, I place in the casing on top of the slow setting cement 30, a plug 31 carrying the usual flexible members 32, and also a cup leather 33 which forms with the casing a fluid tight seal preventing substantial leakage of fluid under pressure, downwardly past the plug.

Circulating fluid 34 is now pumped into the casing above plug 31 and the volumes 29 and 30 of cement, together with the plugs, forced down to the bottom of the casing as illustrated in Fig. 2 wherein the lower plug is shown to have just reached the point of engagement with part 23 of the cementing shoe 17. Pumping of circulating fluid is continued to exert pressure against plug 31, which in turn first forces the body 29 of fast setting cement downwardly past plug 26 (the flexible members 28 being deflected downwardly to pass the cement as shown in Fig. 3) and thence through openings 24 and through the cementing shoe into the well. The application of fluid pressure to plug 31 is continued until the body 29 of fast setting cement has been displaced upwardly around the casing to a point spaced a predetermined distance above the bottom of the casing, for example above the point indicated by the dotted line L' in Fig. 4.

As illustrated, the body of quick setting cement is forced up around the casing and is supported by a portion 29a of the slow setting cement, the remaining portion 29b of which, however, preferably is allowed to remain in the casing. Either by the seating of valve 21 on shoulder 22 to prevent return flow of cement into the casing, or by maintaining continued fluid pressure on plug 31, the fast setting cement is supported above the level L' until it sets sufficiently to form a barrier, or in other words sufficiently long that it will not flow or be displaced upwardly by the pressure subsequently applied to the slow setting cement.

After the cement barrier has been formed in the manner described, a substantial added pressure is applied to plug 31 to compress the slow setting cement 29a within the space around the lower portion of the casing, and to cause this cement to deeply penetrate the interstices of the water bearing formation 36 and thoroughly seal off the water from access to the casing. As previously mentioned, the slow setting cement is also compressed to eliminate any voids in the cement itself, thus rendering it completely impervious to water. During the operation of compressing the slow setting cement, the portion 29b that has remained in the casing above plug 26, may or may not be completely forced out into the well, depending upon the porosity of the formation, the presence of cavities, and various other possible conditions. If desired, the casing fluid pressure may be maintained on the slow setting cement until it has at least taken a partial or substantial set, after which the head may be removed from the casing and drilling operations resumed.

I claim:

1. The method of cementing well casing that includes, forming a cement barrier in the space between the outside of the casing and the wall of the well bore at a point above the lower end of the casing, by pumping a volume of cement downwardly through the casing into said space and allowing said cement to at least partially set, pumping a second volume of cement down through the casing at the same time the first mentioned volume of cement is being pumped through the casing, and discharging the second mentioned volume of cement into the space surrounding the casing below said barrier.

2. The method of cementing well casing that includes, forming a cement barrier in the space between the outside of the casing and the wall of the well bore at a point above the lower end of the casing, by pumping a volume of cement downwardly through the casing into said space and allowing said cement to at least partially set, pumping a second volume of cement down through the casing at the same time the first mentioned volume of cement is being pumped through the casing, discharging the second mentioned volume of cement into the space surrounding the casing below said barrier, and then compressing and forcing the last mentioned cement into the formation interstices.

3. The method of cementing well casing that includes, forming a cement barrier in the space between the outside of the casing and the wall of the well bore at a point above the lower end of the casing, by pumping a volume of relatively quick setting cement downwardly through the casing into said space and allowing said cement to at least partially set, pumping a second volume of relatively slow setting cement down through the casing at the same time the first mentioned volume of cement is being pumped through the casing, and discharging the second mentioned volume of cement into the space surrounding the casing below said barrier.

4. The method of cementing well casing that includes, simultaneously pumping two successive volumes of cement downwardly through the casing, discharging one of said volumes of cement into the space surrounding the casing and allowing it to at least partially set to form a barrier above the lower end of the casing, and forcing the other volume of cement into said space immediately below said barrier.

5. The method of cementing well casing that includes, simultaneously pumping two successive volumes of cement downwardly through the casing, discharging one of said volumes of cement into the space surrounding the casing and allowing it to at least partially set to form a barrier above the lower end of the casing, forcing the other volume of cement into said space immediately below said barrier, and compressing and forcing the last mentioned cement into the formation interstices below said barrier.

6. The method that includes, simultaneously pumping a volume of relatively fast setting cement followed by a volume of relatively slow setting cement downwardly through the casing, successively discharging said volumes of cement into the well bore surrounding the casing so that the quick setting cement is deposited above the slow setting cement, and allowing said cements to set and harden.

7. The method that includes, simultaneously pumping a volume of relatively fast setting cement followed by a volume of relatively slow setting cement downwardly through the casing, depositing said volume of quick setting cement above the volume of slow setting cement in the space surrounding the lower portion of the casing, and allowing said cements to set and harden.

8. The method that includes, simultaneously pumping a volume of relatively fast setting cement followed by a volume of relatively slow setting cement downwardly through the casing, discharging the volume of fast setting cement into the space surrounding the casing, allowing the last mentioned cement to at least partially set to form a barrier in said space and forcing the slow setting cement into said space against said barrier.

9. The method that includes, simultaneously pumping a volume of relatively fast setting cement followed by a volume of relatively slow setting cement downwardly through the casing, discharging the volume of fast setting cement into the space surrounding the casing, allowing the last mentioned cement to at least partially set to form a barrier in said space and compressing the slow setting cement against said barrier and forcing said slow setting cement into the formation interstices.

10. The method that includes, simultaneously pumping a volume of relatively fast setting cement followed by a volume of relatively slow setting cement downwardly through the casing, discharging the volume of fast setting cement into the space surrounding the casing, allowing the last mentioned cement to set sufficiently to form a barrier in said space while at least a portion of said slow setting cement remains in the casing, and then compressing the slow setting cement against said barrier and forcing said slow setting cement into the formation interstices.

11. The method that includes, simultaneously pumping a volume of relatively fast setting cement followed by a volume of relatively slow setting cement downwardly through the casing, discharging the volume of fast setting cement upwardly around the casing followed by at least a portion of said slow setting cement, allowing the fast setting cement to set sufficiently to form a barrier around the casing at a point above its lower end, and then compressing the slow setting cement against said barrier.

12. The method that includes, simultaneously pumping a volume of relatively fast setting cement followed by a volume of relatively slow setting cement downwardly through the casing, discharging the volume of fast setting cement upwardly around the casing followed by a portion of said slow setting cement, and allowing the fast setting cement to set sufficiently to form a barrier around the casing at a point above its lower end while a portion of the slow setting cement remains in the casing.

13. The method that includes, simultaneously pumping a volume of relatively fast setting cement followed by a volume of relatively slow setting cement downwardly through the casing, discharging the volume of fast setting cement upwardly around the casing followed by a portion of said slow setting cement, allowing the fast setting cement to set sufficiently to form a barrier around the casing at a point above its lower end while a portion of the slow setting cement remains in the casing, and then compressing the slow setting cement against said barrier.

JOHN E. BRANTLY.